Figures 1, 2, 3:
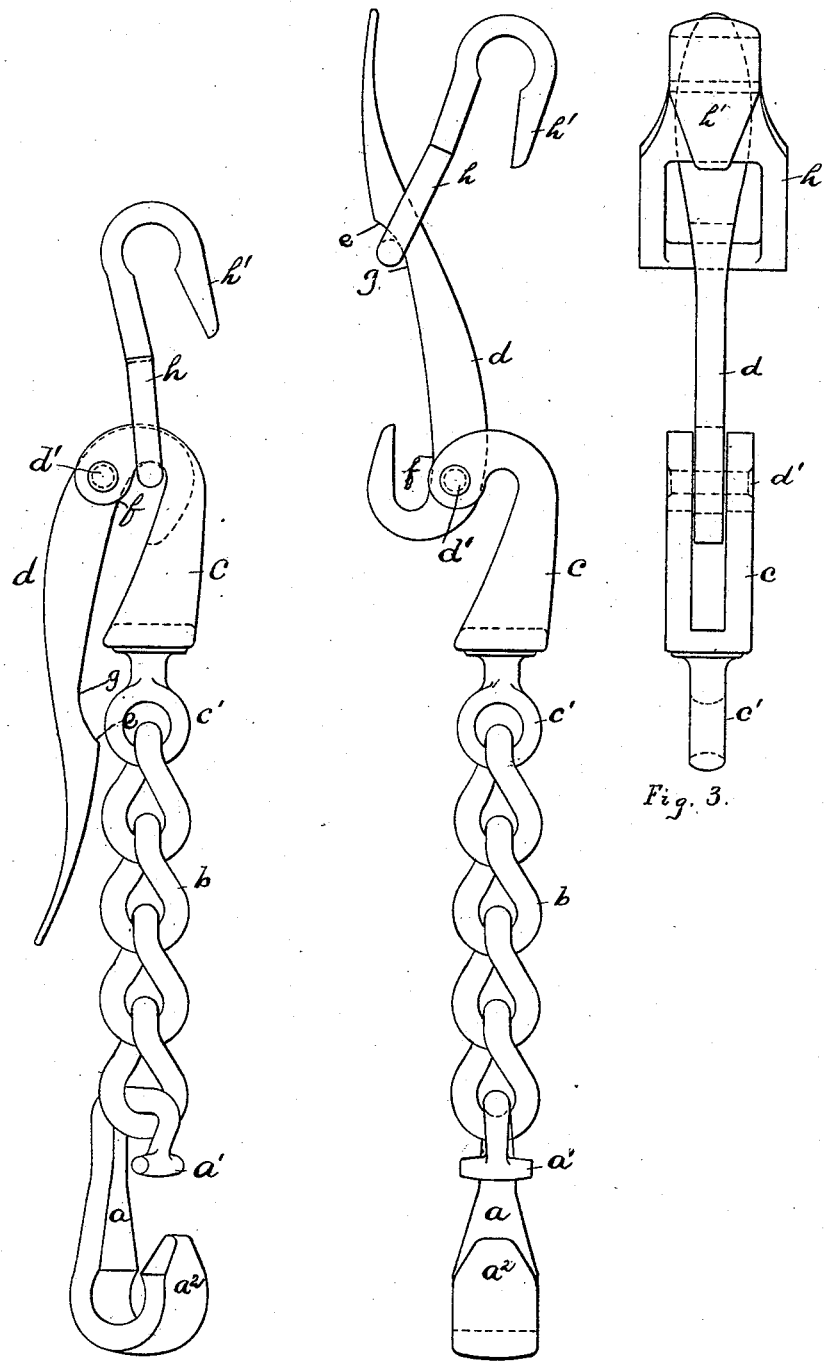

(No Model.)

W. L. HEINZER & H. B. GILLINGHAM.
HAME FASTENER.

No. 321,026. Patented June 30, 1885.

WITNESSES: INVENTOR.

United States Patent Office.

WILLIAM L. HEINZER AND HENRY B. GILLINGHAM, OF PHILADELPHIA, PA.

HAME-FASTENER.

SPECIFICATION forming part of Letters Patent No. 321,026, dated June 30, 1885.

Application filed April 21, 1885. (No model.)

*To all whom it may concern:*

Be it known that we, WILLIAM L. HEINZER and HENRY B. GILLINGHAM, both citizens of the United States, residing at Philadelphia, Pennsylvania, have invented a new and useful Improvement in Hame-Fasteners, of which invention the following is a specification.

Our invention relates to devices for fastening hames in place about a horse-collar; and it consists of a combination of a cross-bar hook flexibly attached to one of the hames at or near its lower extremity, a twisted link-chain one end of which is adjustably attached to said hook, a hooked lever which is provided with a curved recess of peculiar form and is pivoted on a hooked head at the opposite end of said chain, and a hook or an eye flexibly attached to the fellow hame at or near the lower extremity thereof.

In the drawings, Figure 1 is a side elevation of our fastening device, showing the several parts thereof in the positions they hold when the lever is closed and the hames are fastened. Fig. 2 is a side elevation of the same, showing its several parts in the positions they hold when the lever is open and has its free end inserted through the eye of the fellow hame preparatory to being closed. Fig. 3 is a front elevation of the same, omitting the chain.

$a$ is a hook provided with the cross-bar $a'$. The hook $a$ is intended to be attached to a corresponding hook, ring, or staple on one of the hames by hammering down the portion $a^2$. $b$ is a chain of twisted links adjustably attached to the hook $a$ by passing the cross-bar $a'$ through any link of the chain, as desired. $c$ is a bifurcated hook, of which the eye $c'$ is a permanent part, the two being preferably cast together. $d$ is a hooked lever pivoted to the hook $c$ at $d'$, and provided with a curved recess, $e f$, whereof the radius of the curve measuring from $e$ to $g$ is much shorter than that of the curve from $g$ to $f$. The functions of the short curve $e g$ are, first, to keep the eye $h$ from slipping off the lever $d$ when that lever is in the position shown in Fig. 2, and, second, to facilitate the closing down of lever $d$ into the position it is shown in Fig. 1 to occupy. The eye $h$ is intended to be attached to a corresponding hook, ring, or staple on the fellow hame by hammering down the portion $h'$.

The object of giving the links of chain $b$ a twisted form, as shown, is to avoid the use of swivels. We thus avoid wear of the connected parts and the expense of renewals consequent on such wear. Our construction is also less expensive. It will be seen that using the twisted links it makes no difference in the facing of the chain which one of the links is applied to the hook $a$; hence with twisted links swivels are unnecessary.

A chain with flat or plain links may be substituted for the twisted-link chain $b$; but in such case the chain must include a swivel in its length or connections.

We claim—

A hame-fastening consisting of the hook $a$, provided with the malleable or clinchable portion $a^2$, twisted-link chain $b$, hooked head $c$, provided with the eye $c'$, hooked lever $d$, provided with the recess $e f$ and pivoted on head $c$, and the hook $h$, provided with the malleable or clinchable portion $h'$, substantially as set forth.

WM. L. HEINZER.
H. B. GILLINGHAM.

Witnesses:
P. A. FENIMORE,
J. E. SHARD.